April 7, 1964   J. R. PATTEE   3,128,429
INTEGRATING APPARATUS USING A TORQUE CONVERTER REBALANCED BY
THE OUTPUT OF A GENERATOR DRIVEN BY THE CONVERTER OUTPUT
Filed May 9, 1961   2 Sheets-Sheet 1

JOHN R. PATTEE
INVENTOR.

BY
ATTORNEY

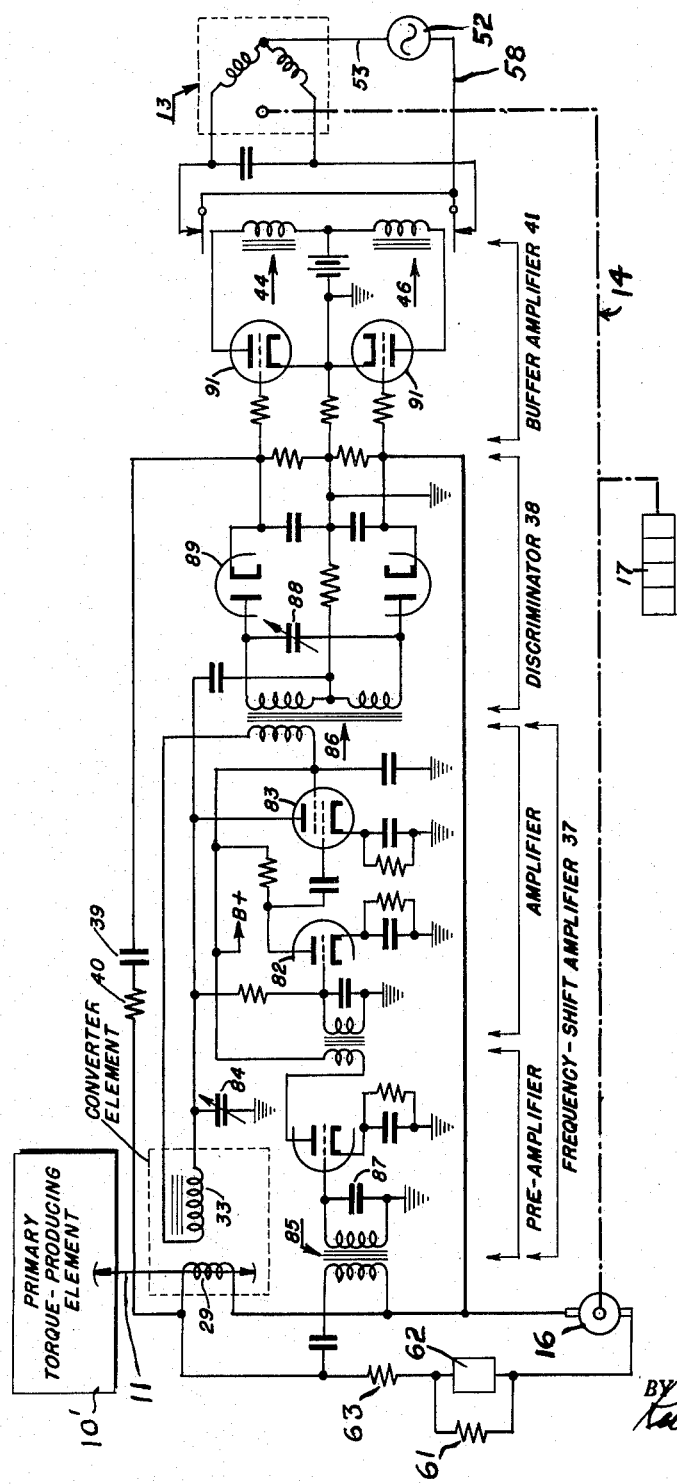

United States Patent Office 3,128,429
Patented Apr. 7, 1964

3,128,429
INTEGRATING APPARATUS USING A TORQUE CONVERTER REBALANCED BY THE OUTPUT OF A GENERATOR DRIVEN BY THE CONVERTER OUTPUT
John R. Pattee, Scotch Plains, N.J., assignor to Daystrom Incorporated, Murray Hill, N.J., a corporation of New Jersey
Filed May 9, 1961, Ser. No. 108,885
7 Claims. (Cl. 324—99)

This invention relates to an integrating apparatus and more particularly to an apparatus for integrating any electrical or mechanical variable, or variables, capable of producing a mechanical torque, or force.

In a broad sense, my invention comprises an arrangement wherein a mechanical torque or force produced by any mechanical or electrical source is converted into shaft rotation at an average speed proportional to the torque or force, the revolutions of the shaft being measurable by a suitable counter mechanism, or the like, connected to the shaft. The novel system described hereinbelow is applied to a watt hour meter but is equally applicable for the integration of variables such as current, potential (D.-C. or A.-C.), the product of two variable currents or potentials, a varying weight, a force, a torque, or the like.

Integration of a variable by my method is accomplished by applying the torque or force produced by the primary torque or force producing means to a transducer which includes means converting the primary torque or force to an A.-C. voltage. The A.-C. output voltage from the transducer actuates a reversible motor in a direction to conform with the sense or direction of the primary torque or force applied to the transducer. The motor drives a constant-resistance D.-C. generator having an output which is fed to the said transducer, the current output of the generator being proportional to the generator speed. The transducer includes also means converting the generator current to a second torque or force which opposes the primary torque or force. The load on the generator is also of a constant resistance whereby a predetermined milliampere-seconds per revolution of the generator is provided. Thus, the number of revolutions of the generator is directly related to the time integral of the primary torque or force, and a mechanical counter may be coupled to the generator to provide a visual indication of the rotation thereof which is directly related to the said time integral.

An object of this invention is the provision of an integrator for determining the precise time integral of an electrical or mechanical torque or force producing variable.

Another object of this invention is the provision of an integrating apparatus for time integrating a torque or force produced by any primary torque or force producing means, the said apparatus comprising a transducer which includes means for converting a torque or force to a voltage and which also includes means converting direct current to a torque, or force, a motor responsive to the voltage output from the transducer and rotatable in a direction related to the sense or direction of the primary torque or force applied to the transducer, a constant resistance D.-C. generator coupled to the motor, means connecting the generator output current to the said transducer, means for converting a direct current to a torque or force, the resultant torque or force opposing the primary torque or force, the said transducer means for converting a direct current to a torque or force being included in a constant-resistance load circuit for the generator whereby the generator provides a predetermined milliampere-seconds per revolution thereof, the number of revolutions of the generator being directly related to the time integral of the primary torque or force applied to the transducer.

A further object of this invention is the provision of an integrating apparatus, as above-described, in which the transducer comprises an electromagnetic means mechanically coupled to the primary torque producing means.

These and other objects and advantages of the invention will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:

FIGURE 3 is a schematic circuit diagram of the system shown in FIGURE 2.

Figure 1:
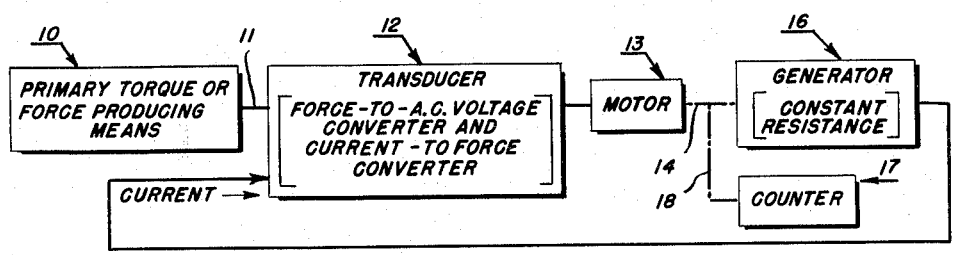
FIGURE 1 is a block diagram of my novel integrating apparatus.

Reference is first made to FIGURE 1 of the drawings wherein there is shown a primary torque or force producing means 10 coupled through a mechanical linkage 11, which may comprise a staff, or the like, to a transducer 12. The primary torque or force-producing means 10 forms no part of my invention but is included for purposes of illustration only. (In FIGURE 2, an electrodynamometer element is shown as a torque producing means.) The transducer includes means converting the primary torque or force at the input linkage 11 to a voltage output which is connected to a motor 13. The motor is energized to rotate in a direction related to the sense or direction of the primary torque or force applied to the transducer. The motor output is mechanically coupled through a linkage 14 to a generator 16 having a current output proportional to the generator speed. The output current from the generator is fed back to the transducer 12. The transducer includes also means converting the generator current to a second torque or force which opposes the primary torque or force. The generator load, which includes the current-to-torque or force converting means of the transducer 12, is also of a constant resistance. It will be understood that with the generator operating in a constant-resistance circuit, the time integral of the generator current is directly proportional to the number of revolutions of the generator. The number of revolutions of the generator may be counted by means of a mechanical counter 17 connected thereto through linkage 18 and calibrated directly in terms of the time integral of the primary torque or force- producing means. Obviously, the read out means is not limited to a mechanical counter mechanically coupled to the generator. Instead, for example, an electrical contact feeding pulses to a magnetically actuated counter or printer could be used. This invention is not limited to any particular counter or read out means.

Figure 2:
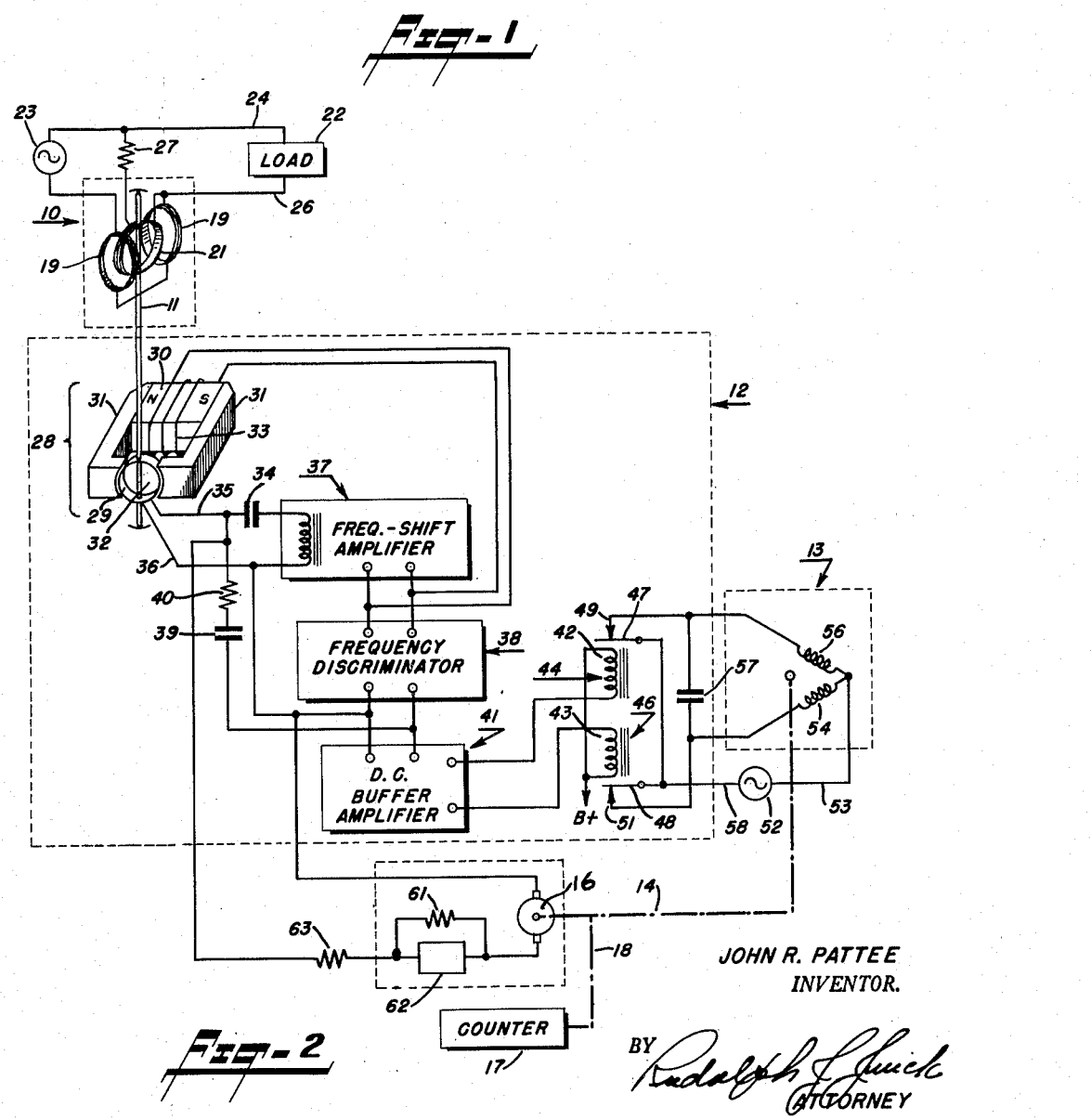
FIGURE 2 is a schematic circuit diagram, with portions thereof, in block diagram, of one form of the system shown in FIGURE 1.

Reference is now made to FIGURE 2 of the drawings wherein the primary torque or force producing means 10 is shown comprising an electrodynamometer mechanism which includes field coils 19, 19 and a movable coil 21, the latter being secured to the staff 11. The electrodynamometer element is generally similar to that used in conventional dynamometer indicating instruments. The dynamometer may be designed for maximum differential coupling by flattening and compacting the field coils 19, 19 about the movable coil 21 since the mechanism operates adjacent a point of zero mutual inductance.

In FIGURE 2, the arrangement is shown connected for measurement of power of the load 22 supplied by an alternating current source 23 through lines 24 and 26. The source 23 may comprise any suitable alternating current supply, such as the ordinary 110 volt 60 cycle per second source, and the power consumption of any type load 22 may be measured. The input current for the field coils 19, 19 is derived by the connection thereof in series circuit with the load 22, while the input current for the movable coil 21 is derived from the wattmeter potential circuit which includes a dropping resistor 27 connected in series circuit relation with the movable coil 21 across the load 22. Thus, the fixed coils 19, 19 are fed a current which is proportional to the load current while the movable coil 21 is fed a current which is proportional to the load potential. Torque produced by the current flow through the coils of the dynamometer element is balanced by the converter element 28 included in the transducer 12 in the novel integrating arrangement of this invention.

The converter element 28 for deflection sensing and conversion to torque for balance against the primary torque-producing means 10 comprises a D.-C. mechanism having a coil 29 secured to the common staff 11. A permanent magnet 30 is utilized to establish a unidirectional magnetic flux field between the pole pieces 31, 31 and the core 32. Current is brought to and received from the movable coil 29 by means of ligaments or hair springs (not shown) which, unlike hair springs for many conventional instruments, are made as weak as possible. Ideally, the suspension should be made torqueless and the rotation should not be limited thereby. An alternating magnetic flux field is also provided across the movable coil 29 by means of a coil 33, here shown diagrammatically as encircling the magnet 30, said coil 33 being energized by an appropriate high frequency current. It will be apparent, therefore, that the movable coil 29 rotates in a magnetic flux gap that includes the steady flux field of the permanent magnet 30 and the alternating flux field produced by the coil 33.

When the movable coil 29 is in its normal, zero-center position, as shown in the drawings, the A.-C. field flux linkage is zero. However, deflection of the movable coil 29 causes such coil to link, proportionally, the A.-C. component of the flux field and an A.-C. potential is induced therein, such potential having a magnitude and phase proportional to the degree and direction of coil deflection. Thus, deflection of the coil 29, in response to the torque produced by the primary torque producing mechanism 10, will result in induction of an A.-C. voltage in the movable coil 29, which can be amplified.

The solid iron flux paths normally used in D.-C. instrument structures are not efficient for the high-frequency component of the magnetic flux and conversely the magnetic materials suitable for high frequencies have permeabilities insufficient for the relatively high level of steady flux of the permanent magnet. A composite magnetic structure is, therefore, employed; a suitable structure being shown in Patent No. 2,838,232, dated June 10, 1958, of R. W. Gilbert, which patent is incorporated by reference herewithin.

The converter element serves to convert very small deflections of the staff 11 into a high-frequency component of voltage which is fed through lead wires 35 and 36 and a blocking capacitor 34 to an amplifier 37. The high frequency component of the voltage developed in the coil 29 is amplified by the amplifier 37 and phase rectified by the frequency discriminator 38. A surge capacitor 39 and a resistor 40 are included in a feedback path between the discriminator output and the movable coil 29.

The D.-C. output voltage from the discriminator 38 is also amplified by a buffer amplifier 41 and applied either to the control winding 42 or the control winding 43 of power relays 44 and 46, respectively. The relays are provided with movable contacts 47 and 48 which are in normally closed condition with fixed contacts 49 and 51, respectively. With a low amplifier output voltage from the D.-C. buffer amplifier 41, the relay contacts 47 and 48 remain in the normally closed positions. With a signal of one polarity, the movable arm 47 will break contact with the fixed contact 49, and with an opposite polarity signal the movable arm 48 will break contact with the fixed contact 51.

The power relays 44 and 46 control the energization of the reversible, split phase motor 13. The motor energization circuit is of a conventional design and includes an A.-C. power source 52 which is connected through a lead wire 53 to the common connector between a pair of quadrature oriented motor field windings 54 and 56. A phase splitting capacitor 57 is connected between the other ends of the motor field windings and between the relay fixed contacts 49 and 51. The energization circuit is completed through a lead wire 58 connected between the other side of the A.-C. potential source 52 and the relay movable arms 47 and 48. In the illustrated unenergized condition of the relays, the contacts are closed and the A.-C. potential 52 is applied to both motor windings 54 and 56 in parallel. The currents in the two windings are in-phase whereby the motor remains stopped. As is well understood by those skilled in this art, out-of-phase currents in the two motor windings produces a reaction causing the motor armature to rotate in one direction or the other, depending upon the relative phase between the two currents. The relative phase is controlled by the actuation of the relays 44 and 46 which, in turn, are controlled by the polarity of the energizing potential to the buffer amplifier 41. Therefore, if a signal of one polarity from the frequency discriminator 38 results in a clockwise rotation of the motor, a signal of the opposite polarity will result in a counterclockwise rotation. When the signal output from the discriminator 38 falls to a sufficiently low value, the open relay returns to its normally closed position and the motor stops rotation.

As mentioned above in the description of FIGURE 1, the motor 13 drives the D.-C. generator 16, through the linkage 14, which generator is of the tachometer type for production of an output current which is directly proportional to the speed of rotation of the generator and the polarity of which is dependent upon the direction of rotation thereof. The generator circuit preferably includes a shunt-connected resistor 61 and thermistor 62 which are located adjacent the generator armature and are, therefore, subject to substantially the same temperature conditions as the armature for compensation for temperature changes therein in a manner well understood by those skilled in this art. The temperature compensation means provides for a constant resistance generator under variable temperature conditions. While not shown in the drawings, other temperature compensating means may be included for compensation of the magnet temperature coefficient of the generator magnet and converter element magnet, which means are well known to those skilled in this art.

The current output from the generator is connected through a calibrating resistor 63 to the movable coil 29 in a manner to produce a torque opposing the torque produced by the primary torque producing means 10. The blocking capacitor 34 prevents the flow of direct current in the input circuit of the amplifier 37. The load on the generator 16 provided by the coil 29 and calibrating resistor 63 is of a constant resistance. As mentioned above, since the constant resistance generator operates into a constant resistance load circuit, a predetermined amount of milliampere seconds per revolution of the generator is obtained which is passed through the coil 29 to generate a predetermined amount of dyne-centimeter seconds per revolution of the generator. A mechanical counter 17, or the like, is connected to the generator and is responsive to the rotation thereof. Since the generated current has a time integral which is directly proportional to the number of revolutions thereof, the counter provides a visual indication of the said time integral.

In the operation of the arrangement of FIGURE 2, when the motor-generator is not rotating and a torque is applied to the staff 11 by the primary torque producing means 10, the coil 29 is deflected from its normal, zero, center position causing the coil to link, proportionally, the A.-C. component of the flux field within which the coil operates. An A.-C. potential is thereby induced in the coil 29, which potential has a magnitude and a phase proportional to the degree and direction of the coil deflection. The high frequency component of voltage is amplified by the frequency shift amplifier 37 and phase rectified by the frequency discriminator 38. Output current from the frequency discriminator is fed back, through the surge capacitor 39, to the coil 29, thereby producing a torque on the coil which opposes and tends to balance the primary torque provided by the means 10. The surge capacitor 39 will gradually become charged by the current flow therethrough. The frequency discriminator output is also applied to the D.-C. amplifier 41 for control of the power relays 44 and 46 in the control circuit of the motor 13. When the motor is energized for drive actuation of the generator 16, the generator current through the coil 29 is of such a magnitude to generate a torque on the staff 11 which is greater than the torque provided by the primary torque producing means 10. The algebraic sum of the torque provided by the current flow in the feedback loop which includes the surge capacitor 39 and coil 29 and the torque provided by the generator current through the coil 29 is then opposed in sense to the torque of the primary torque producing means 10, and the feedback current from the frequency discriminator through the surge capacitor 39 is reversed to maintain torque balance. The surge capacitor 39 is thereby gradually discharged, and the motor generator stops. The revolution of the generator is indicated on the counter 17 for an indication of the time integral of the primary torque-producing means. The calibration of the integrator is not affected by the valve of the surge capacitor 39, the capacitor 39 being selected to have negligible leakage current only. If the motor-generator were able to respond instantaneously to the output from the frequency discriminator, the need for the surge capacitor would be eliminated. Obviously, inertia of the mechanical system prevents such instantaneous response and friction errors would result without the use of the surge capacitor.

Reference is now made to FIGURE 3 of the drawings wherein the frequency-shift amplifier 37, frequency discriminator 38 and buffer amplifier 41, which are shown in block form in FIGURE 2, are shown by schematic circuit diagram. In FIGURE 3, block 10' represents any primary torque producing element or means, for production of a torque in the staff 11 which torque produces a displacement of the movable coil 29 of the converter element 28 from its normal, zero coupling position with respect to the alternating flux field provided by the high frequency field coil 33. The Amplifier section, comprising one-half of the vacuum tube 82 and the tube 83, normally is in stable oscillation and feeds oscillating current to the field coil 33 which is tuned to resonance by the capacitor 84. As explained above, deflection of the converter movable coil 29 produces therein an A.-C. component of potential having a magnitude and phase-direction proportional to the degree and direction of coil deflection. This A.-C. component is amplified by the Pre-Amplifier which consists of the other half of the vacuum tube 82. The input transformer 85 and the Discriminator transformer 86 are of conventional cup-core construction and are resonated at the operating frequency of the system, say, 200 kilocycles per second, by the associated capacitors 87 and 88, respectively. The bulk of the output impedance is in the field coil 33 and its associated capacitor 84, with the discriminator transformer 86 coupled by inserting its primary winding in series with the field coil 33, as shown. This phases the discriminator properly. Actually, the primary winding of the discriminator transformer consists of a relatively few turns, the number of turns determining the coefficient of coupling between the separately-resonated field coil 33 and the secondary winding that is connected to the dual diode rectifier 89.

The Discriminator is a conventional balance type, as commonly used in radio practice, and is phased by the capacitive connection to the output stage plate. The D.-C. output of the discriminator, therefore, is balanced at the center frequency of the current supplied to the field coil 33 and is polarized with respect to frequency shift as the movable coil 29 deflects from its normal, zero position. It is pointed out that the converter field coil 33 and the discriminator transformer secondary winding are separately turned to the same center frequency and coupled. The coupling coefficient may thus be selected to slightly overcouple the two resonant circuits to develop a double peaked impedance and phase characteristic identified with the overcoupled condition. Overcoupling in proper amount provides a method of simple adjustment of the system to any desired incremental sensitivity about the center-frequency point and a relatively high sensitivity over reasonable excursions from such center point.

The discriminator output is fed to the buffer amplifier 41 comprising a balanced circuit arrangement including tubes 91, 91 connected in a push-pull fashion. The output from the buffer amplifier is connected to the power relays 44 and 46. The remainder of the circuit is shown in detail in FIGURE 2 and described above.

The integrator of my invention is calibrated by applying a measured amount of watts, torque, or force to the transducer 12 for a measured length of time, and adjusting the current/speed characteristic of the generator 16 until the counter 17 registers the correct value. This is most easily done by adjusting the resistance 63 of the generator circuit, but could also be done by shunting the field magnet of the generator.

Having now described my invention in detail, in accordance with the requirements of the patent statutes, various changes and modifications will suggest themselves to those skilled in this art, and it is intended that such changes and modifications shall fall within the spirit and scope of the invention as recited in the following claims.

I claim:

1. Apparatus for producing a time integral of a mechanical torque provided by a primary torque producing means and comprising, an electromagnetic means to which the mechanical torque of the primary torque producing means is mechanically coupled, the said electromagnetic means developing an alternating current component having a magnitude and phase sense respectively relating to the magnitude and direction of rotation of the electromagnetic means provided by the mechanical torque produced by the primary torque producing means, means phase rectifying the said alternating current component to produce a corresponding first output direct current, a feedback path including a series-connected surge capacitor feeding a portion of said output direct current back into the electromagnetic means and producing a torque opposing the torque produced by the primary torque producing means, a motor responsive to the said output direct current, means actuated by the motor and producing a second direct current output, and means feeding said second direct current output back into said electromagnetic means to produce a torque opposing the torque produced by the primary torque producing means, the amount of rotation of the motor being directly related to the time integral of the torque provided by the primary torque producing means.

2. The invention as recited in claim 1 including counting means coupled to the motor and providing a visual indication of the time integral of the torque of the primary torque producing means.

3. The invention as recited in claim 1 including a staff mechanically coupling the primary torque producing means to the electromagnetic means, the said electromagnetic means including a wire-wound movable coil secured to the staff and rotatable in a composite flux field that includes a unidirectional and an alternating magnetic flux, the said alternating current component being developed in the movable coil upon rotation thereof, the first direct current through the said surge capacitor and the second direct current output from the means actuated by the motor being fed back into the said movable coil.

4. The invention as recited in claim 1 wherein the primary torque producing means comprises an electrodynamometer mechanism having a movable coil mechanically coupled to the electromagnetic means.

5. An apparatus for time integrating a primary force produced by a primary force producing means, said apparatus comprising in combination: converter means having output terminals, said converter means producing at said output terminals an alternating electric signal corresponding to said primary force; discriminating means coupled to said output terminals for converting said alternating electric signal into a direct current signal; a feedback path for feeding a portion of said direct current signal to said output terminals; a motor responsive to said direct current signal from said discriminating means and rotatable in a direction related to the sense of said primary force; a constant resistance direct current generator coupled to said motor; means connecting the output signal generated by said generator to said output terminals; said converter including means for converting both signals which are applied to said output terminals by said feedback path and said generator to a secondary force opposing said primary force, whereby the number of revolutions of said generator is directly related to the time integral of said primary force.

6. The invention as recited in claim 5 including counting means coupled to said generator and providing a visual indication of the time integral of the primary force.

7. The invention as recited in claim 5 wherein said converter includes an electromagnetic means to which the primary force producing means is mechanically coupled and to which the generator output current is applied, the load on the generator provided by the electromagnetic means being of a constant resistance.

References Cited in the file of this patent

UNITED STATES PATENTS

| | | |
|---|---|---|
| 2,849,669 | Kinkel | Aug. 26, 1958 |
| 2,886,751 | Gilbert | May 12, 1959 |

OTHER REFERENCES

Greenwood, Holdom, Macrae: Electronic Instruments, page 84, FIGURE 4.29, McGraw-Hill, New York, 1948.